July 14, 1931.   J. DE BACKER   1,814,297
CHANGE SPEED DEVICE
Filed Oct. 6, 1928   4 Sheets-Sheet 2

INVENTOR.
J. de BACKER.
By Featherstonhaugh & Co.
ATTYS.

July 14, 1931.  J. DE BACKER  1,814,297
CHANGE SPEED DEVICE
Filed Oct. 6, 1928   4 Sheets-Sheet 4

INVENTOR.
J. de BACKER
By
ATTYS

Patented July 14, 1931

1,814,297

UNITED STATES PATENT OFFICE

JOSEPH DE BACKER, OF UCCLE-BRUSSELS, BELGIUM

CHANGE SPEED DEVICE

Application filed October 6, 1928, Serial No. 310,788, and in Belgium April 14, 1928.

This invention relates to power-transmitting change-speed device which is applicable to all self propelling vehicles and apparatuses, fixed motors and machines, and more particularly to the engines of motor vehicles.

It has for its object to provide a change-speed device allowing of a continuous and progressive change of speed whilst eliminating the irrational operating of sliding gears generally employed, which are rotated, by engagement with their respective pinions, at relative speeds out of the established ratios.

A further object of the invention, therefore, is to eliminate the difficult shifting of such gears, which must be effected slowly by means of a lever, whilst employing a gear transmission.

Yet another object of the present invention is to provide a continuous and progressive driving movement, that may be controlled, between the driving and the driven shafts, and to suppress thereby the loss of power due to the interruption at the neutral position, in the transmission of power during the change from one speed to another such as is produced in change-speed devices employing sliding gears.

This, whilst allowing of the use of several speed reduction ratios, which are obviously determinated and may be controlled, allows of proportioning, according to circumstances and at the will of the driver, the speed of rotation of the engine to the resistance to farward movement encountered by the vehicle.

This invention is based upon the following kinetic principle:

A ratio of decrease or increase, by inversion of sense, established between a couple of intermeshing gear wheels, one driving and the other driven, increases or decreases between this couple of gear wheels on account of the continuous angular displacement, in one sense or in the other, of the plane formed by the axes of the two gear wheels with regard to an initial plane, the axis of one of both gear wheels which form the couple remaining constantly the vertex of the displacement angle and the angular speed of the driving gear wheel remaining constant during said angular displacement.

It is further based on the following principle of operation:

1°.—To resolve the rotative motion of the motor into two rotative motions, the one independent of the other, each produced by a group of gear wheels always in mesh, the first of these two motions being produced by a group of gear wheels arranged in a fixed manner between the driving and driven shafts, the second motion being produced by a group of gear wheels independent of the driving and driven shafts as well as of the first group of gear wheels;

2°.—To obtain in the first group of gear wheels a variable ratio by means of variable continuous angular displacements of the plane of the axes of the gear wheels and, consequently, a variable ratio between the driving and driven shafts; this operation being obtained by a constant connection of the motions of the two independent groups of gear wheels.

The invention, according to these principles, is characterized by the combination of a spur gear train wherein, on aligned driving and driven shafts, a driving pinion actuates a driven pinion by intermediary pinions, the journals of which are maintained in a casing rotatable on the said driving and driven shafts to be moved in variable circular movements, during a same angular speed of the said driving pinion, by a differential epicyclic gear train which includes two sun wheels meshing with planetary pinions, the journals of which are also maintained by the rotatable casing maintaining the journals of the intermediary pinions of the spur gear train, whilst the two sun wheels are arranged concentrically with the driving and driven shafts, may be driven independently one from the other and independently from the driving pinion of the spur gear train and are provided with means preventing them to rotate in the opposite sense to that of the said driving pinion.

This invention may be carried into effect to operate either by increase or decrease of speed ratio between a driving shaft and a driven shaft.

The accompanying drawings show, by way of examples, three constructional forms of a change-speed device operating by decrease of speed ratio, especially applicable to motor vehicles.

Figure 1:
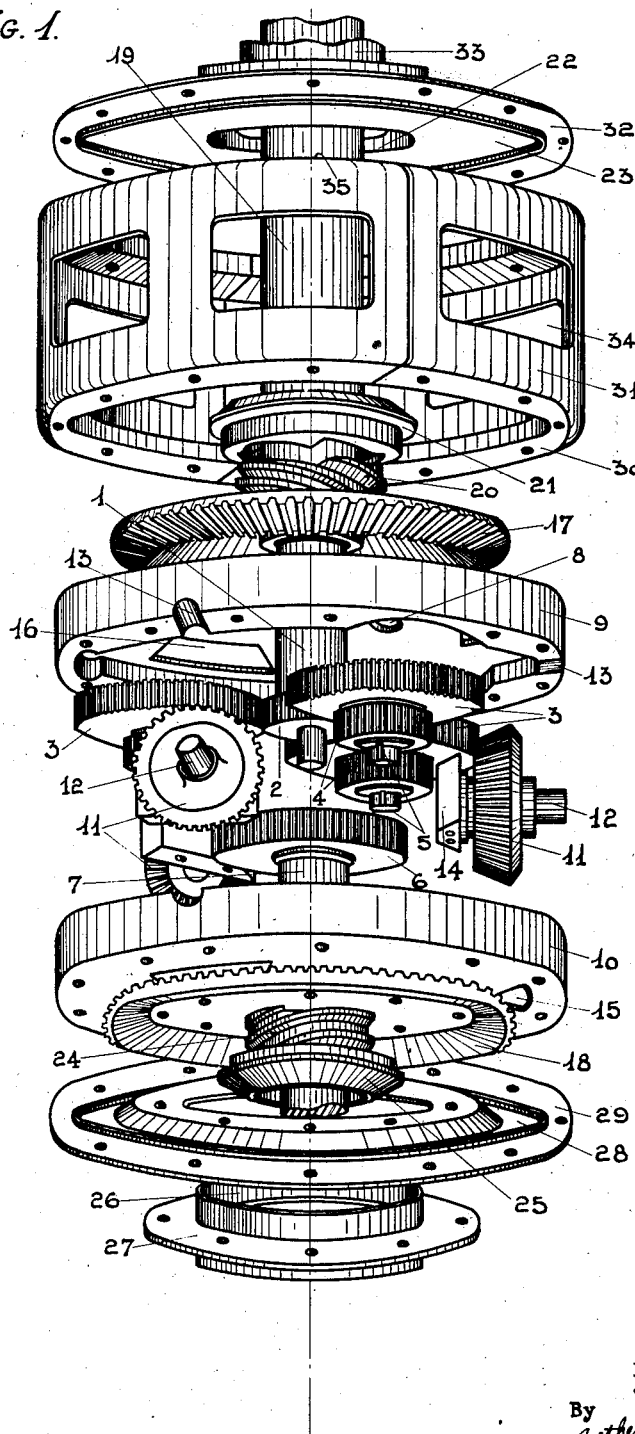
Fig. 1 is a perspective view of a first constructional form of the change-speed device, this being shown with the casing and the parts put out of joint. The differential epicyclic gear train of this constructional form is constituted by bevel gear wheels.
Figure 2:
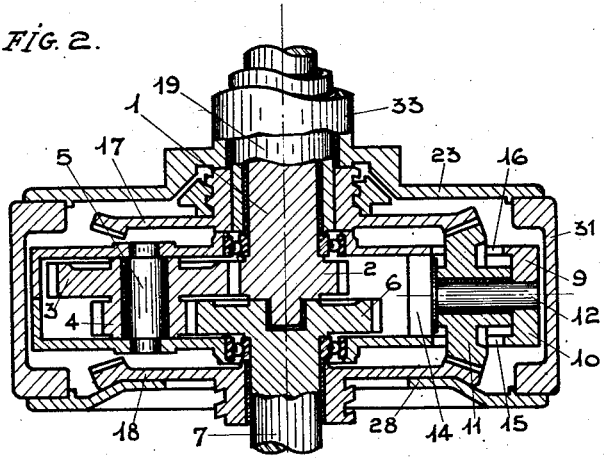
Fig. 2 is a longitudinal section, in elevation, of the gear wheel mechanism proper of this first constructional form, normally jointed and enclosed in its casing.
Figure 3:
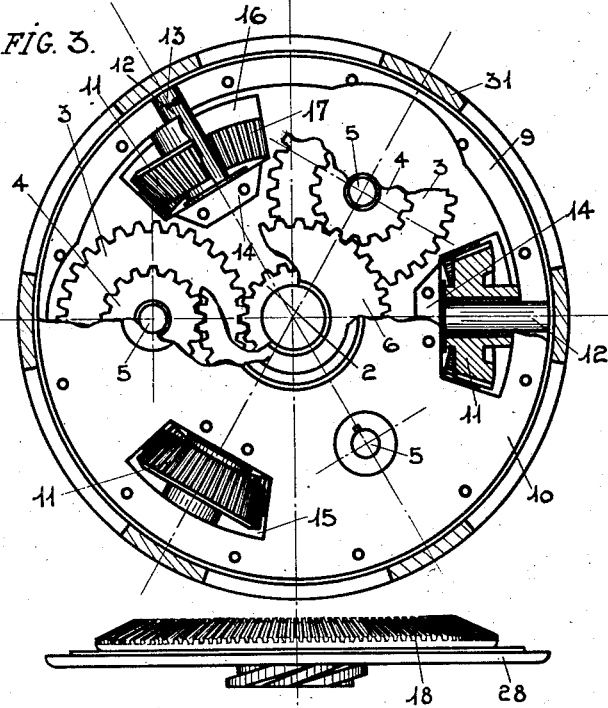
Fig. 3 is a transversal section of Fig. 2, parts being broken away to show the combination of the gear wheel groups.

Referring to the drawings, the driving shaft 1, receiving the power to be transmitted to the driven shaft 7, is provided at one extremity with a driving pinion 2 secured thereto or integral therewith and constantly in mesh with intermediary pinions 3 of a larger diameter. These intermediary pinions 3 are each formed integral with a co-axial intermediary pinion 4 of lesser diameter than the pinions 3. The intermediary pinions 3 and 4 are mounted freely on journals 5. The pinions 4 are constantly in mesh with a driven pinion 6 of larger diameter, which is secured to or integral with the driven shaft 7, the longitudinal axis of which is in the same line as that of the shaft 1.

Between each pair of intermediary pinions 3 and 4, as shown in Figs. 1, 2, 3 and 4, there is interposed a planetary pinion 11 freely rotatable on a journal 12, which is directed perpendicularly to the shafts 1 and 7.

All these pinions are arranged in a casing formed by two shells 9 and 10. In the future this casing will be designated by the two latter united reference 9, 10. The extremities of the journals 5, which may be of cylindrical section with keys, or of square or other section, engage and are secured in suitably shaped mortises 8 provided in the shells 9 and 10, facing one another in pairs. Similarly the outer cylindrical end of the journal 12 is located in a mortise formed by semi-cylindrical borings 13 of the edges of the shells 9 and 10 which are jointed and held together, for example, by means of bolts. The inner end of the journals 12 is formed integral with a shoulder 14 which is secured in place within the jointed shells 9 and 10 also, for example, by means of bolts.

The shafts 1 and 7 extend centrally through the shells 9 and 10 respectively, and serve as pivots therefor. In each of the shells 9 and 10, there are provided ports 15 and 16, facing one another in pairs, through which portions of the planetary pinions 11 project to mesh with sun wheels 17 and 18 mounted one on each side of the casing 9, 10. The sun wheel 18 rotates freely on the driven shaft 7 whilst the sun wheel 17 is secured, by means of flutings or the like, to a hollow shaft 19 arranged concentrically on the driving shaft 1.

The hub of the sun wheel 17 is provided with a screw-thread 20, left-handed for a sense of rotation indicated by the arrow $z$ (Fig. 4), upon which an internally threaded male cone 21 may be displaced longitudinally by rotating. This cone 21 can engage in a female cone 22 formed in a plate 23. Similarly, the hub of the sun wheel 18 is provided with a screw-thread 24, but this one being right-handed, upon which an internally threaded male cone 25 may be displaced longitudinally by rotating. The cone 25 can engage in a corresponding female cone 26 formed in a flange 27 secured to the casing 59 (partially indicated in Fig. 4), which encloses the whole mechanism.

The male cones 21 and 25, or the respective female cones 22 and 26, or the two pairs of cones may be provided with grooves, teeth or the like, or with any appropriate material in order to prevent sliding movement of the cones one in the other, when they are in engagement.

A plate 28 is rigidly mounted against the sun wheel 18 and is formed with a central aperture in order to leave the cone 25 entirely free.

The above described mechanism, assembled by the jointed shells 9 and 10, is lodged within a ring 31, and is maintained therein by means of the plate 28, the flat rim 29 of which is secured, by means of bolts for example, to the corresponding edge 30 of the ring 31 and by means of the plate 23, the flat rim 32 of which is secured, also by means of bolts for example, to the opposite edge 35 of the ring 31 (see Fig. 1).

The plate 23 is rigidly mounted on a hollow shaft 33, which is arranged concentrically with the hollow shaft 19 and consequently with the driving shaft 1.

Tht lubrication of the parts mentioned is effected by a lubricant stored at a convenient level in the gear box, and circulated by means of the rotary movement of the mechanism. This lubricant will reach the above mentioned members through apertures 34 provided in the periphery of the ring 31 and the ports 15 and 16, already mentioned, of the shells 9 and 10.

Figure 4:
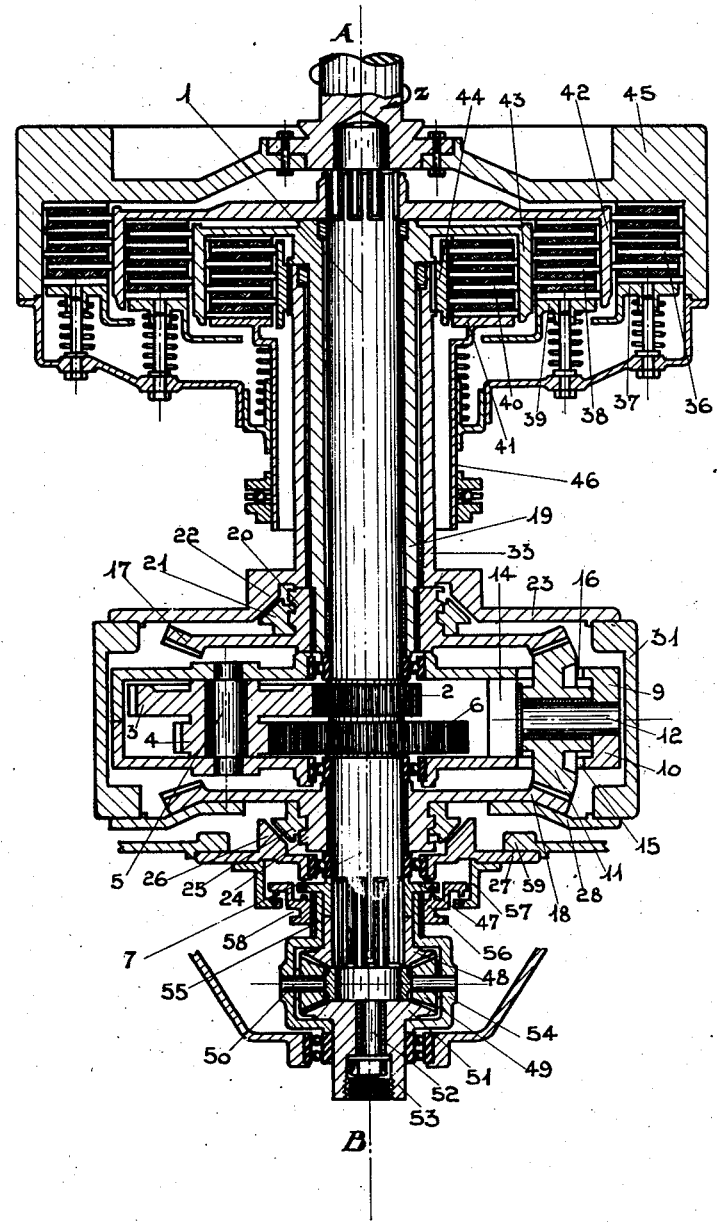
Fig. 4 is a longitudinal section of the complete first constructional form of the change-speed device provided with a clutch control mechanism and a reversing gear, the latter also allowing of the engine running free when the vehicle is stationary.

A controlling system being necessary to put in operation the gear wheel mechanism constituting the change-speed device proper, a three-stage multiple-disc clutch has been chosen. This clutch, shown in Fig. 4, is not novel in itself but is simply an application of a known system given here, by way of example, in order to make the operation of the gear wheel mechanism quite clear. Control by means of multiple-disc clutches is not to be considered as essential to this invention as other clutch system or other suitable mechanism may be employed.

Furthermore, there is provided, as an auxiliary means, to the mechanism of the invention a bevel wheel reversing gear, in order to be able to obtain the reverse motion as well as the neutral position for the free running of the engine when the vehicle is stationary. This mechanism, shown in Fig. 4, not forming part of the invention, is also given simply as example and may be replaced by any other system answering the same purpose.

As can be seen from Fig. 4, the end of the driving shaft 1, opposite to that carrying the driving pinion 2, carries, by means of flutings for instance, a drum 42 provided with clutch discs, at 36, on its outer periphery, which can be engaged and driven by discs mounted on the inner periphery of the fly wheel 45, also at 36.

The inner periphery of the drum 42 carries clutch discs, at 38, which can engage with discs mounted, also at 38, on the outer periphery of a drum 43. This latter is mounted, also by means of flutings for instance, on the end of the hollow shaft 19 opposite to that carrying the sun wheel 17.

The inner periphery of the drum 43 carries clutch discs, at 40, which can engage with discs mounted, also at 40, on the outer periphery of a sleeve 44, that is secured, by means of flutings for example, on the end of the hollow shaft 33 opposite to that carrying the plate 23.

Spring pressure plates 37, 39 and 41 correspond respectively to each of the clutches mounted at 36, 38 and 40. The plate 41 is moreover prolonged by a sliding sleeve 46 intended to receive the clutching or unclutching control by means of a pedal (not shown) provided for the foot of the driver.

The plate 41, after having been drawn back sufficiently to release the discs mounted at 40, touches the plate 39, which, being drawn back by a second backward motion of the plate 41, releases the discs mounted at 38. Similarly the plate 39, after having drawn sufficiently backward to release the discs mounted at 38, touches the plate 37, which by means of a new backward drawing of the plate 41, and thus also of the plate 39, releases the discs mounted at 36. In the reverse operation, the clutching will first occur at 36, then at 38 and finally at 40.

When the plate 41, acting under the control of the clutch pedal, by means of the sliding sleeve 46, is maintained at the end of its clutch-releasing travel, then this plate 41 maintains the plate 39, and by means of this latter, the plate 37 in the clutch-releasing position. The fly wheel 45 turns freely in the direction indicated by the arrow $z$ and the driving shaft 1 and the hollow shafts 19 and 33 are stationary.

The driver of the vehicle releasing the clutch pedal progressively up to about one third of its travel, the plate 37, pushed by its springs and guided in its travel by the plate 39, which is actuated by its own springs and travels as far as the plate 41 will allow, clutches the discs at 36. The drum 42 is thus driven by the clutching in with the fly wheel 45, and drives with it the driving shaft 1, upon which it is mounted, and also the driving pinion 2. The driving pinion 2 imparts to the intermediary pinions 3 and 4 a rotative movement in the opposite direction, but, because of the resistance to moving of the driven shaft 7 and consequently of the driven pinion 6, the intermediary pinions 3 and 4 react and tend to revolve around the driving pinion 2 and the driven pinion 6 in a direction of rotation opposite to that of the driving pinion 2. This reaction to which the intermediary pinions 3 and 4 are subjected is transmitted by their journals 5 to the casing 9, 10. From the casing, this reaction is transmitted by the journals 12 of the planetary pinions 11, and by these latter to the sun wheels 17 and 18. But the sun wheels 17 and 18 cannot rotate in a sense opposite to that of the driving pinion 2. In fact, the male cone 25, in consequence of its inertia and guided by the screw-thread 24 of the hub of the sun wheel 18, is first of all drawn and then driven by this sun wheel 18, when this latter starts and rotates in the same direction as the fly wheel, indicated by the arrow $z$. On the contrary, if the rotation of the sun wheel 18 slows down and stops, the male cone 25, in consequence of its inertia and of the start which has been imparted thereto, rotates upon the hub of the sun wheel 18 and, guided by the screw-thread thereon, engages in the female cone 26 of the flange 27. By the reaction of the sun wheel 18 in a direction opposed to that in which the driving pinion 2 rotates, the screw-thread 24 presses the make cone 25 into the fixed female cone 26, on which it cannot slide. The cone 25 prevents, in turn, by means of the said thread, rotation of the sun wheel 18 in the direction opposed to that of the driving pinion 2. The sun wheel 18, the plate 28, the ring 31 and the plate 23, being all rigidly connected together, cannot therefore rotate in the opposite direction to that of the driving pinion 2.

By a similar action of the male cone 21, produced by the internal thread of the said cone and the corresponding screw-thread 20 of the hub of the sun wheel 17 which carries this cone 21, this latter, by the reaction to which the said sun wheel is subjected, is pressed into the female cone 22 of the plate 23, which, as has just been indicated, cannot rotate in the opposite direction to that of the driving pinion 2. Thus the male cone 21 prevents the sun wheel 17 also to rotate in the opposite direction to the driving pinion 2.

The sun wheels 17 and 18 not being able to rotate by the effect of the reaction in an opposite direction to that of the driving pinion 2, prevent in their turn, by means of the planetary pinions 11 with the help of their journals 12, the casing 9, 10 from rotating in this direction also. The journals 5 are held stationary by the said casing and the driven pinion 6 as well as the driven shaft 7 are driven in the sense of rotation of the driving pinion 2, by the intermediary pinions 3 and 4.

The reduction ratio of this movement is the predetermined ratio, established by the builder, between the driving pinion 2 and the driven pinion 6. It constitutes the greatest reduction or, otherwise expressed, the first speed. It must be pointed out that, in the first speed, only the spur gear train fixed in a constant manner between the driving shaft 1 and the driven shaft 7 is in motion, the differential epicyclic gear train remaining stationary.

By the release of the clutch pedal by another third part of its travel and by the operation of the pressure plates as already described, the plate 39 compresses the discs at 38. By means of the clutching in, at 36, the drum 42 is driven by the fly wheel 45 and, consequently, the clutching in, at 38, drives the drum 43 at the same speed as the fly wheel 45. The hollow shaft 19 carrying the drum 43 is driven by this latter and drives the sun wheel 17, simultaneously to the driving motion of the driving pinion 2 and without interrupting the said driving motion. By reason of the structure of the thread 20 of the hub of the sun wheel 17 and the corresponding internal thread of the male cone 21, and in consequence of the inertia of the latter, the cone 21 disengages from the female cone 22 and is driven by the sun wheel 17 which therefore is released from the plate 23. The reaction to which the casing 9, 10 is always subjected maintains its effects. This reaction, to which the sun wheels 17 and 18 are also subjected, is overcome by the driven sun wheel 17, but maintains the sun wheel 18 stationary by means of the male cone 25 pressed into the female cone 26.

It is known that, in a differential epicyclic gear train like the one shown in Figs. 1, 2, 3 and 4, the differential ratio, that is to say the number of revolutions made by the planetary pinions (such as 11) around the longitudinal axis (such as A B) of the differential epicyclic gear train, is constantly equal to half of the sum of the number of revolutions of the two sun wheels (such as 17 and 18).

In the present operation, the sun wheel 17 only rotates, together with the driving pinion 2, whilst the sun wheel 18 is stationary. The planetary pinions 11, according to the above mentioned differential principle, are thus driven in a differential circular movement of translation, around the longitudinal axis A B, at a number of revolutions which is constantly equal to half the number of revolutions made by the sun wheel 17. By means of their journals 12, the planetary pinions 11 drive in their circular movement of translation the casing 9, 10 also at a speed equal to half that of the sun wheel 17 and of the driving pinion 2. The casing 9, 10 drives with it the intermediary pinions 3 and 4 in a circular movement of translation, at a proportional speed to that of the driving pinion 2. But if, for a same angular speed of the driving pinion 2, the intermediary pinions 3 are driven, around the driving pinion 2 and in the same sense of rotation as it, in a differential circular movement of translation proportional to the angular speed of the driving pinion and equal to half the number of revolutions of said driving pinion, then the intermediary pinions 3 only make from then on a number of revolutions upon their journals 5 equal to half the number of revolutions that involves the ratio established between the gear wheels 2 and 3.

The intermediary pinions 4 being each integral with an intermediary pinion 3, their number of revolutions upon their journals, for a same angular speed of the driving pinion 2, is also reduced by half. The number of revolutions of the driven pinion 6 is also reduced by half, this pinion being driven by the intermediary pinions 4.

On the other hand, in a parallel manner and inversely proportional to the reduction of the number of revolutions of the intermediary pinions 4 upon their journals, these pinions 4 are driven in a circular movement of translation, in the sense of rotation of and around the driven pinion 6, at a number of revolutions equal to half the number of revolutions of the driving pinion 2. The intermediary pinions 4 being the driving gears for the driven pinion 6, the latter is driven, moreover of the gear movements and for a same angular speed of the intermediary pinions 4, by a number of revolutions equal to the circular movement of translation of these pinions 4, the circular movement of translation of which is equal to half of the number of revolutions of the driving pinion 2.

Thus, if, on the one hand, for a same angular speed of the driving pinion 2, the ratio of reduction in the drive of the driven pinion 6 by the gearing is reduced of a value equal to the differential ratio, the angular speed of the driven pinion 6 is increased, on the other hand, by an angular speed equal to the differential ratio. This motion, in which only the sun wheel 17 is driven together with the driving pinion 2, constitutes the second predetermined ratio or otherwise expressed the second speed.

By releasing the clutch pedal by the last third part of its travel, and by the operation of the pressure plates as already described, the plate 41 compresses the discs at 40. It has been seen that for the second speed, the drum 43 is driven by the fly wheel 45. By the clutching in of the discs at 40, the sleeve 44 is driven and drives the hollow shaft 33 at the same speed as the fly wheel 45. The hollow shaft 33 drives the plate 23, but as the plate 23, the ring 31, the plate 28 and the sun wheel 18 are all rigidly connected, the sun wheel 18 is also driven by the hollow shaft 33.

The disengaging afore described, in the second speed motion, of the cone 21 is here repeated with the male cone 25. This, by reason of the structure of the thread 24, separates itself from the female cone 26 and is driven by the sun wheel 18, which is thus free from the flange 27.

The planetary pinions 11 rotate no more on their journals 12, but are driven in a circular movement of translation by the two sun wheels 17 and 18, at the same speed as these latter, around the longitudinal axis A B; that is to say in a proportional movement equal to the angular speed of the driving pinion 2. The casing 9, 10, driven by the planetary pinions 11 by means of their journals 12, also rotates at the same speed as the driving pinion 2. The intermediary pinions 3, the journals 5 of which being carried by the said casing, are driven in a circular movement of translation, around the driving pinion 2, at a number of revolutions constantly equal to the number of revolutions of the said driving pinion 2. These intermediary pinions 3 evidently do not now rotate on their respective journals 5, nor do the intermediary pinions 4. As the intermediary pinions 4 cannot now rotate on their journals 5, but are driven around the longitudinal axis A B in a proportional circular movement of translation constantly equal to the angular speed of the driving pinion 2, they drive the driven pinion 6 at the same speed as the driving pinion 2. The intermediary pinions 3 and 4, in the present motion, serve simply as keys between the driving pinion 2 and the driven pinion 6. The whole of the various members constituting the change-speed device revolves as a unit, without movement of the gears, around the longitudinal axis A B. This motion, wherein the two sun wheels 17 and 18 are driven together with the driving pinion 2, constitutes the determined ratio of 1 to 1 or the ratio called "direct drive" or "high speed".

It is constant, in the mechanism of the present invention, that, for a same angular speed of the driving pinion, the fractional ratio of the speed-reduction established between the driving and driven pinions decreases, in a parallel manner with the progressive driving engagement of the sun wheels, by arithmetical progression, of a ratio itself progressive which is constantly equal to the geometrical progression of the ratio established between the driving pinion and the driven pinion and having for its ratio the synchronous differential ratio.

In parallel manner, the fractional ratio of speed reduction, decreasing of its ratio itself progressive, increases by arithmetical progression, the ratio of this latter being the synchronous differential ratio.

Inversely, in parallel manner to the decreasing driving engagement of the sun wheels, these self-same ratios increase and decrease respectively.

This movement of two inversely proportional synchronous progressions, the one increasing and the other decreasing, constitutes an infinity of ratios comprised between the smallest and the biggest ratio and is translated into a progressive motion between these ratios. Each ratio of this infinity of ratios can be expressed by the following formula, which is constant, assuming X to be the fractional ratio established between the driving and driven pinions and Y the differential ratio:

$$X - (XY) + Y = \text{the working ratio.}$$

By successive unclutching, the various speed-reductions go on increasing, starting from the ratio of 1:1, or direct drive, up to the speed-reduction ratio which is the determinated ratio established between the driving pinion 2 and the driven pinion 6. It goes without saying, that the complete unclutching of all the clutches interrupts the drive.

The progressivity between the speeds is established by the progressive driving, by means of the clutches, of the sun wheels 17 and 18 and it is transformed into absolute progressivity by the operation of the mechanism itself. This progressivity is either slow or quick, continuous or intermittent according as to whether the clutching or unclutching operations are themselves slow or quick, continuous or intermittent, this depending on the wish of the driver.

All the reduction ratios or speeds, as well as the slow or quick progressivity between these latter and the complete unclutching operation, can be obtained by the one control of one pedal, thus leaving the hands of the driver completely free for steering the vehicle.

As the speed-reductions progress towards the direct drive, the intermediary pinions rotate more slowly on their journals so that, when driving direct, the gear wheels rotate no more, neither in the spur gear train nor in the differential epicyclic gear train. All the gear wheels then act simply as keys and the whole mechanism revolves on itself, as one unit, around the longitudinal axis A B.

By the continuous and decreasing change of ratios up to the first speed, which can be easily controlled, this mechanism, acting through the progressive braking of the engine, constitutes a doubly progressive powerful emergency brake. It further permits at small driving speeds, by an increase in the speed-reduction between the driven shaft and the engine which is just as easy to establish, of suitably proportioning the speed of rotation of the engine to the speed of the vehicle and of reducing very appreciably the output required from the engine at low speed of rotation.

In a like manner, the ease of transition from a lower speed to a higher speed and the progressive driving motion between these speeds permits of an acceleration in the speed of the vehicle, which is more powerful and rapid whilst at the same time requiring smaller outputs of the engine, the increasing engine speed not lowering again as it is not interrupted during the change of speed.

Reverse driving can be obtained, for instance, by adjoining to the change-speed device a bevel wheel reversing gear, such as shown in Fig. 4 and which can at the same time afford by means of a claw or toothed coupling-device the neutral position necessary to the free running of the engine, when the clutches are engaged and the vehicle is stationary.

The operation of a bevel wheel reversing gear combined with a claw coupling-device may be arranged, for example, in the manner hereinafter described.

The driven shaft 7 carries, by means of flutings for instance, a claw-plate 47 and a crown wheel 48. The crown wheel 48 meshes with bevel gear wheels 49, mounted loosely on cross arms 50 which revolves freely on the shaft 7. The bevel gears 49 are also in mesh with a crown wheel 51. This crown wheel 51 rotates freely on the extremity 52 of the shaft 7 and is prolonged into a hollow shaft 53, which must transmit the driving movement to the rear axle by means of the cardan shaft (not shown).

The group of bevel gears 49 and crown wheels 48 and 51 is enclosed in a case 54 which maintains the cross arms 50. The extension 55 of the case 54 revolves freely on the hubs of the crown wheel 48 and of the claw plate 47. The extension 55 of the case 54 is provided with flutings upon which can be displaced longitudinally a sliding piece 56 provided, on the one side, with claws that can engage into the claw plate 47, and, on the other side, with claws that can engage in corresponding claws of the rim of a drum 57 rigidly mounted either on the flange 27 or on the casing 59 enclosing the change-speed device.

The control of the longitudinal movement of the sliding piece 56 can be effected by means of a fork (not shown) which engages in the groove 58 of said sliding piece. The fork itself can be controlled by a lever near the hand of the driver.

When the sliding piece 56 is, as shown in Fig. 4, at the middle of its longitudinal travel, then its claws are not engaged either in the claw plate 47 or in the drum 57. The driven shaft 7 drives with it the claw plate 47 and the crown wheel 48. The crown wheel 48 transmits a rotative movement to the bevel gear wheels 49 and rotates with it these bevel gears 49, the cross arms 50 and the case 54, around the longitudinal axis A B, at a speed equal to half its proper speed. The crown wheel 51 is thus free of all driving movement and can be held stationary. This position of the sliding piece 56 establishes the neutral position to allow the engine to run free, the vehicle being stationary and the clutches being engaged.

When on the one hand, the claws of the sliding piece 56 are engaged with the claw plate 47, this latter drives the sliding piece 56, which drives the case 54, at the same speed as its own which is also that of the driven shaft 7. The crown wheel 48 is also driven by the shaft 7. The case 54 and the crown wheel 48 revolving together at the same speed, the bevel gears 49 can no more revolve on their cross arms 50 and, acting as keys, drive the crown wheel 51 at the same speed as that of the crown wheel 48 which is also the speed of the driven shaft 7. This whole mechanism revolves therefore around the longitudinal axis A B without relative movement of the gears. This position of the sliding piece 56 establishes the engagement for the speeds of forward driving.

When on the other hand, the claws of the sliding piece 56 are engaged in the claws of the drum 57, the sliding piece 56 is held stationary and maintains the case 54, and by this latter the cross arms 50, also stationary. The crown wheel 48 is driven by the driven shaft 7 and the bevel gears 49 transmit to the crown wheel 51 a rotative motion in the opposite sense to that of the crown wheel 48, and consequently to that of the shaft 7, but at the same speed as that of the said shaft.

This position of the sliding piece 56 establishes the engagement for the speeds of reverse driving.

It must be pointed out, that there are, by means of the described reversing gear, the same determinated ratios, the same progressivity and continuity between these ratios for reverse driving as for forward driving. It is also to be noted that all the speeds as well as the progressivity, either slow or quick, between these speeds and the complete unclutching can be obtained for reverse driving as well as for forward driving, by the control of one single pedal.

Figure 5:
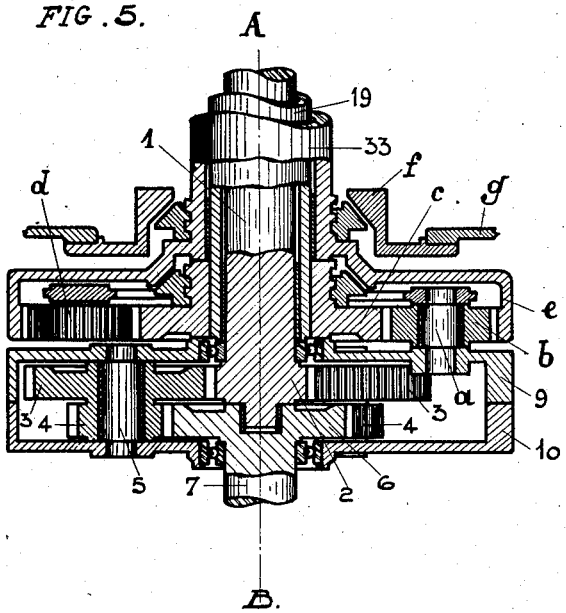
Fig. 5 is a view corresponding to Fig. 2, showing another constructional form in which the differential epicyclic gear train is constituted by spur wheels.

In the embodiment represented in Fig. 5, the differential epicyclic gear train is constituted by spur wheels. The casing constituted by the shells 9 and 10 above described carries journals $a$ upon which planetary pinions $b$ revolve freely. The planetary pinions $b$ mesh, on the one side, with a sun wheel $c$ and, on the other side, with the internal teeth $d$ of an orbit wheel $e$. The journals $a$, three in number, may be interspaced externally to the casing 9, 10, between the journals 5 of the intermediary pinions 3 and 4. The sun wheel $c$ is secured to or integral with the hollow shaft 19, and the orbit wheel $e$ is secured to or integral with the hollow shaft 33, which shafts have already been described. The hub of the sun wheel $c$ is provided with a thread upon which it carries an internally threaded male cone, which can engage into the female cone provided in the orbit wheel $e$. The shaft 33 is also provided with a thread upon which it carries an internally threaded male cone, which can engage into the female cone of a flange $f$ fixed to the casing $g$ (partially shown) enclosing the change-speed device. In this constructional form the two threads are left-handed and fulfil with the male cones they carry and the respective female cones of these latter, the same functions as those already indicated when describing Fig. 4. The shafts 1, 19 and 33 will carry, at their respective ends opposite to the mechanism represented in the present figure, the clutches shown in Fig. 4 or any suitable clutch-device.

In this constructional form, the reduction ratio for the first speed is that established by the builder between the driving pinion 2 and the driven pinion 6, as in the constructional form shown in Figs. 1, 2, 3 and 4, the sun wheel $c$ and orbit wheel $e$ being stationary.

But the working ratio between the driving pinion 2 and the driven pinion 6 for the second speed can be greater, for a same first speed ratio established between the said pinions 2 and 6 and independently of this ratio, than with the constructional form shown in the first four figures. This is realized by providing a differential ratio less by half of a revolution of the casing 9, 10 for one revolution of the driving pinion 2. In fact, for the second speed, the orbit wheel $e$ remains stationary, the sun wheel $c$ only is driven together with the driving pinion 2. The planetary pinions $b$ are driven in a differential circular movement of translation, around the longitudinal axis A B, at a ratio less by half of a revolution for one revolution of the sun wheel $c$, the number of teeth of the sun wheel $c$ being less than the number of teeth of the orbit wheel $e$. The planetary pinions $b$ drive, by their journals $a$, the casing 9, 10, and this latter drives by the journals 5 the intermediary pinions 3 and 4, at a proportional ratio with regard to the angular speed of the driving pinion 2, that is to say at a ratio less by half of a revolution for one revolution of the driving pinion 2.

The desired differential ratio of this differential epicyclic gear train can be established by the variable difference between the number of teeth of the sun wheel $c$ and of the internal teeth $d$ of the orbit wheel $e$, so as to obtain for the second speed the desired ratio between the driving pinion 2 and the driven pinion 6.

When the orbit wheel $e$ is driven, the planetary pinions $b$ drive by their journals $a$ the casing 9, 10 at a speed equal to that of the sun wheel $c$ and orbit wheel $e$, which is that of the driving pinion 2. The ratio between the driving pinion 2 and the driven pinion 6 is then 1:1, as in the constructional form shown in the first four figures.

The continuity and progressivity, slow or quick, between the different speeds remain established in this embodiment as in that represented in the preceding figures.

Figure 6:
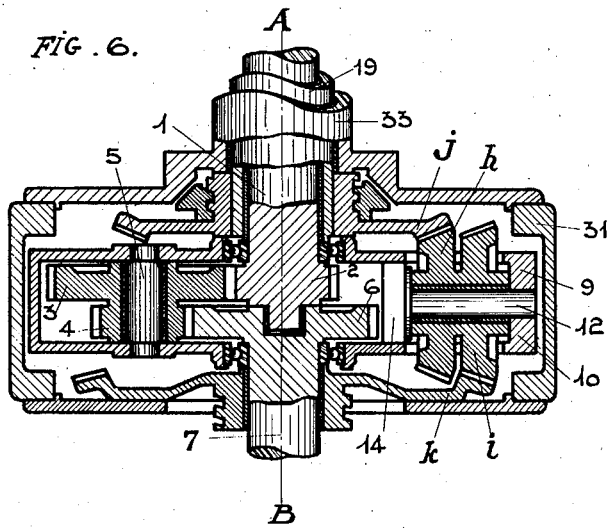
Fig. 6 is another view similar to Fig. 2, showing a constructional form in which the differential epicyclic gear train is of conical shape and comprises double superposed planetary pinions.

The differential epicyclic gear train shown in Fig. 6 is of the conical type and comprise double superposed planetary pinions $h$ and $i$ which are integral together and have a number of teeth equivalent or different between them. The lower planetary pinions $h$ mesh with the sun wheel $j$ and the upper planetary pinions $i$ mesh with the sun wheel $k$, which sun wheels have a different number of teeth. The shafts 1, 19 and 33 will carry as in the other embodiments the clutches shown in Fig. 4, or any suitable clutch-device.

In this constructional form, the first speed ratio and the ratio of direct drive are the same as in the preceding embodiments, but the working ratio between the driving pinion 2 and the driven pinion 6 can be established, for the second speed, at the will of the builder, independently of the established ratio between the said pinions 2 and 6 for the first speed. In fact, because of the difference in the number of teeth between the planetary pinions $h$ and $i$ relatively to the difference in the number of teeth of the sun wheels $j$ and $k$, the differential ratio can be of more or less than one half revolution of the planetary pinions $h$ and $i$, and thus of the casing 9, 10, around the longitudinal axis A B, for one revolution of the sun wheel which is driven together with the driving pinion 2 at the second speed. The differential ratio will be more or less than one half revolution for one revolution of the sun wheel driven at the second speed according as to whether this sun wheel is the large or the small.

All the advantages and properties indicated for the first constructional form remain also established in the constructional forms of the invention represented in the Fig. 5 and in the Fig. 6.

Other constructional forms and embodiments or modifications could of course be derived from the principles of the present invention by the use of any differential epicyclic gear train, but their diversity of details prevents description being given of them all.

It is of course not absolutely necessary that, in the mechanism shown in the drawings, the intermediary pinion couples 3 and 4 and the planetary pinions 11 (Figs. 1, 2, 3 and 4), b (Fig. 5) or h, i (Fig. 6) are each three in number. They can be each in pairs and opposed to one another, or in fours and opposite in a cross whilst retaining a rotative balanced system, or they may be in groups of a different number and disposed in any suitable manner, without thereby departing from the scope of the invention.

Similarly the device represented by the male cones 21 and 25, and the female cones 22 and 26 and their respective screw-threads does not exclude any other system. On the contrary, it may be replaced by any other system such as a clutch or coupling device, a cam device, a free wheel mechanism or any other system achieving the same purpose as the one above described.

As has been said, the clutch constituting the control of the gear mechanism as shown in Fig. 4 can be replaced by any other clutch, such as single disc clutch, cone clutch or by any other control system. The elimination of certain advantages of progressivity or of the continuity in the driving movement could also not be considered as an innovation outside the scope of the present invention, the combination of the gear wheel mechanism, which is its object, being able to give several ratios by means of the same groups of gear wheels always in mesh.

Finally the devices described and illustrated for producing the neutral position and for reverse driving, which have only been mentioned as examples, may be replaced by any other suitable system fulfilling the same purpose.

Having thus described my invention, what I claim as new and desire to secure by Letters Patent is:

1. In a change speed device, in combination, a spur gear train including a driving shaft, a driving pinion on the shaft, a driven shaft aligned with the driving shaft, a driven pinion thereon, intermediary pinions between the driving pinion and the driven pinion for transmitting the driving movement of the driving pinion to the driven pinion, a differential epicyclic gear train including planetary pinions and two sun wheels meshing with the planetary pinions, the said sun wheels mounted on the same axis of rotation as the driving and driven shafts, and a casing in which the intermediary and planetary pinions are journalled and rotatable on the driving shaft and driven shaft for being driven at variable speeds independently of the angular speed of the said driving pinion.

2. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, and a casing in which the intermediary and planetary pinions are journalled and rotatable on the driving shaft and driven shaft, adapted for moving said intermediary pinions in variable circular movements of translation around the axis of rotation of the driving and driven shafts during a constant angular speed of the said driving pinion for increasing or decreasing the ratio operating between the said driving and driven pinions.

3. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, and two hollow shafts upon which the sun wheels are mounted for driving said sun wheels and arranged concentrically with the driving shaft so as to have the same axis of rotation as the driving and driven shafts and the rotatable casing.

4. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, two hollow shafts arranged concentrically with the driving shaft and upon which the sun wheels are mounted for driving said sun wheels, and means for automatically connecting separately one of the sun wheels with the other and one with the casing enclosing the change speed device, when one or both sun wheels are inoperative, and for automatically disconnecting them therefrom, when one or both are operative.

5. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in circular movements of translation around the axis of rotation of the driving and driven shafts at variable speeds, during a constant angular speed of the driving pinion.

6. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said hollow shafts and said driving shaft constituting together three concentric shafts adapted so as to be successively driven, in progressive and proportional manners to a same angular speed, for driving successively, in progressive and proportional manners to the said same angular speed, the driving pinion and the two sun wheels.

7. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in a differential circular movement of translation, proportional to the angular speed of the driving pinion, when the sun wheel driven in the first place is driven in a proportional manner to the angular speed of said driving pinion, the sun wheel driven in the second place being inoperative.

8. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in a proportional circular movement of translation, equal to the angular speed of the driving pinion, when the sun wheel driven in the second place is driven in a proportional manner to the angular speed of said driving pinion, simultaneously to the proportional driving of the sun wheel driven in the first place.

9. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in differential circular movements of translation, progressive to the angular speed of the driving pinion, when the sun wheel driven in the first place is driven in a progressive manner to the angular speed of the said driving pinion, the sun wheel driven in the second place being inoperative, and when the sun wheel driven in the second place is driven in a progressive manner to the angular speed of the said driving pinion, simultaneously to the proportional driving of the sun wheel driven in the first place.

10. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in circular movements of translation, and said rotatable casing being adapted to drive said intermediary pinions in the same circular movements of translation, progressive and proportional to the angular speed of the driving pinion, to which said planetary pinions are driven, when the sun wheels are successively driven in progressive and proportional manners to the angular speed of the said driving pinion.

11. In a change speed device, in combination, a spur gear train including a driving shaft, a driving pinion on the shaft, a driven shaft aligned with the driving shaft, a driven pinion thereon, and intermediary pinions between the driving pinion and the driven pinions for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, means for automatically connecting separately one of the sun wheels with the other and one with the casing enclosing the change speed device, when one or both sun wheels are inoperative, and for automatically disconnecting them therefrom, when one or both are operative, and two hollow shafts arranged concentrically with the driving shaft and upon which the sun wheels are mounted for driving said sun wheels, said sun wheels being adapted to drive said planetary pinions in circular movements of translation, and said intermediary pinions being adapted to be driven in the same circular, progressive and proportional movements of translation, to which said planetary pinions are driven, during a constant angular speed of the driving pinion for increasing or decreasing progressively or proportionally the ratio operating between the said driving and driven pinions.

12. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, two hollow shafts arranged concentrically with the driving shaft and upon which the sun wheels are mounted for driving said sun wheels, and means for automatically connecting separately one of the sun wheels with the other and one with the casing enclosing the change speed device, when one or both sun wheels are inoperative, and for automatically disconnecting them therefrom, when one or both are operative, one of said means being adapted to act only in inverse sense of the rotation of the driving pinion for automatically connecting the sun wheel driven in the second place with the casing enclosing the change speed device, when said sun wheel is inoperative, to prevent it to react in inverse sense of the rotation of said driving pinion, and for automatically disconnecting it therefrom, when it is operative.

13. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, two hollow shafts arranged concentrically with the driving shaft and upon which the sun wheels are mounted for driving said sun wheels, and means for automatically connecting separately one of the sun wheels with the other and one with the casing enclosing the change speed device, when one or both sun wheels are inoperative, and for automatically disconnecting them therefrom, when one or both are operative, one of said means being adapted to act only in inverse sense of the rotation of the driving pinion for automatically connecting the sun wheel driven in the first place with the sun wheel driven in the second place, when said sun wheel driven in the first place is inoperative, to prevent it to react in inverse sense of the rotation of the said driving pinion, and for automatically disconnecting it therefrom, when it is operative.

14. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, a rotatable casing on the driving shaft and driven shaft in which the intermediary and planetary pinions are journalled, two hollow shafts arranged concentrically with the driving shaft and upon which the sun wheels are mounted for driving said sun wheels, and means for automatically connecting separately one of the sun wheels with the other and one with the casing enclosing the change speed device, when one or both sun wheels are inoperative, and for automatically disconnecting them therefrom, when one or both are operative, said means being adapted to act only in inverse sense of the rotation of the driving pinion to prevent said sun wheels, thereby said planetary pinions, thereby said rotatable casing and thereby said intermediary pinions to react in inverse sense of the rotation of the driving pinion, when said driving pinion being operative, said two sun wheels or one of them is inoperative.

15. In a change speed device, in combination, a spur gear train including a driving shaft, a driving pinion on the shaft, a driven shaft aligned with the driving shaft, a driven pinion thereon, and intermediary pinions between the driving pinion and the driven pinion for transmitting the driving movement of the driving pinion to the driven pinion, a differential epicyclic gear train including planetary pinions and two sun wheels meshing with the planetary pinions and mounted on the same axis of rotation as the driving and driven shafts, said sun wheels being adapted to drive said planetary pinions in circular movements of translation, a rotatable casing on the driving shaft and driven shaft in which the intermediary and planetary pinions are journalled, said rotatable casing being adapted for moving said intermediary pinions in the same circular movements of translation to which said planetary pinions are driven, means for automatically connecting separately one of the sun wheels with the other and one with the casing enclosing the change speed device, when one or both sun wheels are inoperative, and for automatically disconnecting them therefrom, when one or both are operative, said means being adapted to act only in inverse sense of the rotation of the driving pinion to prevent said sun wheels to react in inverse sense of the rotation of said driving pinion, and two hollow shafts arranged concentrically with the driving shaft and upon which the sun wheels are mounted for driving said sun wheels, said hollow shafts and said driving shaft constituting together three concentric shafts adapted so as to be successively driven, to a same angular speed, by means of any clutch acting in three successive engagements so as to successively engage in driving relation the driving pinion and the two sun wheels, the driving relations of said three shafts being broken in inverse successive order, said driving relations of such clutch being controllable by a single clutch pedal substantially as described.

JOSEPH DE BACKER.